(No Model.)  4 Sheets—Sheet 1.

A. J. McDONALD.
ILLUSTRATIVE PLANETARIUM.

No. 583,540.  Patented June 1, 1897.

(No Model.) 4 Sheets—Sheet 2.
A. J. McDONALD.
ILLUSTRATIVE PLANETARIUM.

No. 583,540. Patented June 1, 1897.

Witnesses.
C. F. Kilgor
D. D. Merchant

Inventor.
Angus J. McDonald,
By his Attorney.
Jas. F. Williamson

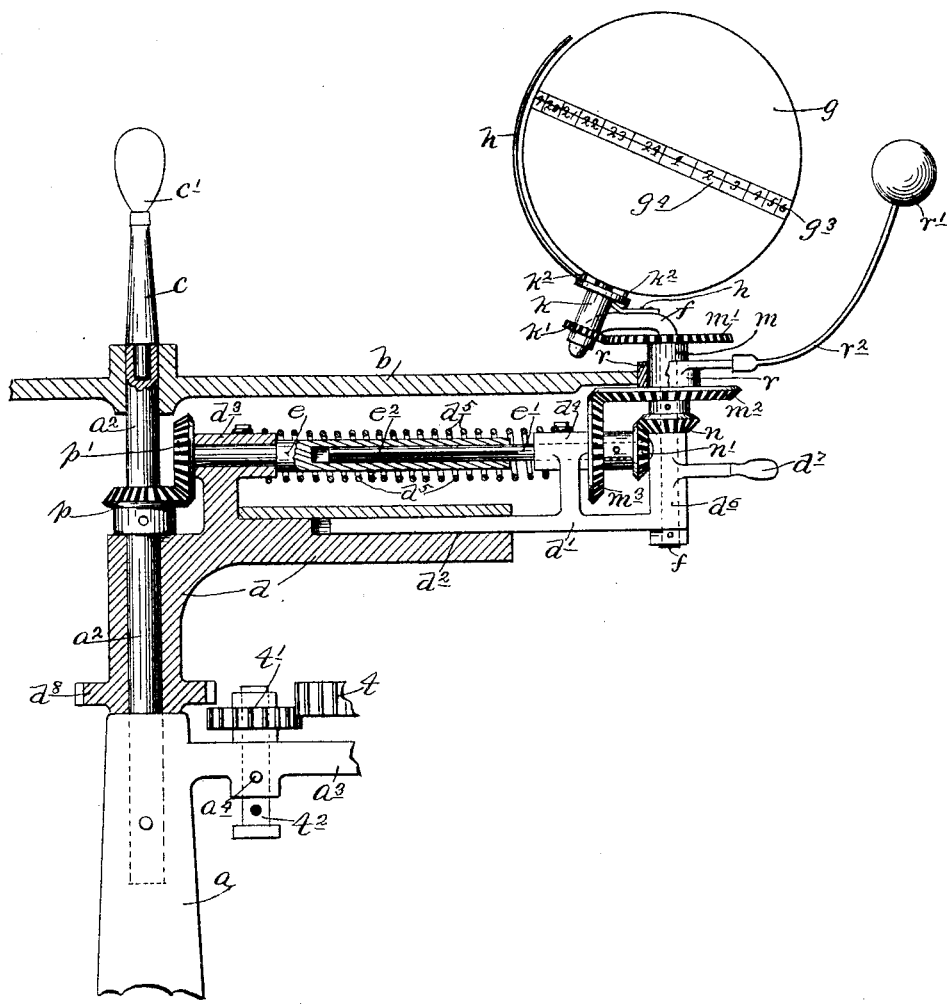

(No Model.) 4 Sheets—Sheet 4.
A. J. McDONALD.
ILLUSTRATIVE PLANETARIUM.
No. 583,540. Patented June 1, 1897.
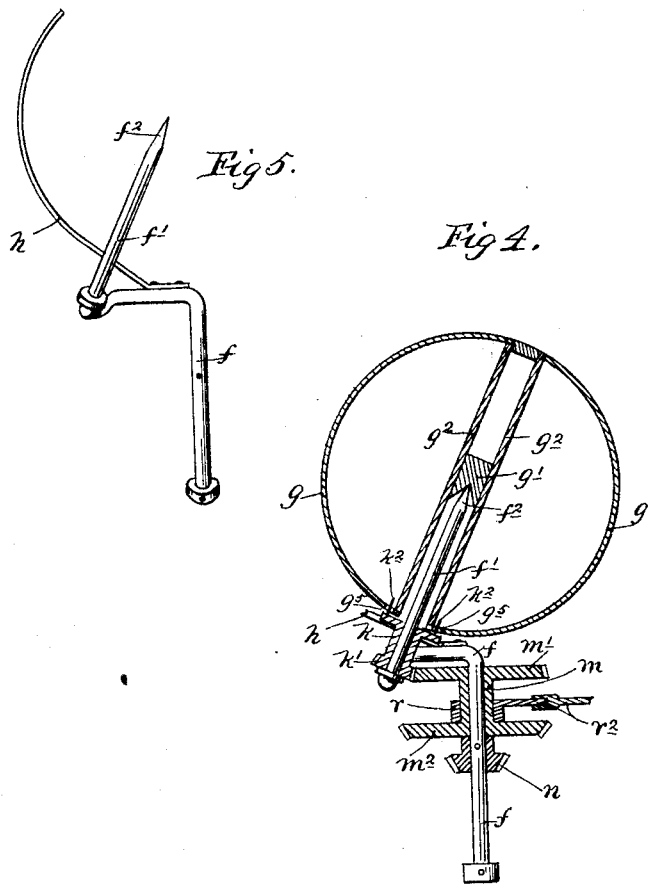

UNITED STATES PATENT OFFICE.

ANGUS J. McDONALD, OF TORONTO, CANADA.

ILLUSTRATIVE PLANETARIUM.

SPECIFICATION forming part of Letters Patent No. 583,540, dated June 1, 1897.

Application filed May 13, 1895. Serial No. 549,044. (No model.)

*To all whom it may concern:*

Be it known that I, ANGUS J. MCDONALD, a citizen of the Dominion of Canada, residing at Toronto, in the Province of Ontario, Canada, have invented certain new and useful Improvements in Illustrative Planetariums; and I do hereby declare the following to be a full, clear, and exact description of the invention, such as will enable others skilled in the art to which it appertains to make and use the same.

My invention relates to and has for its object to provide an improvement in illustrative planetary systems. To this end I employ, in conjunction with the ordinary globes representing the earth and moon, a dome or arch representing the celestial sphere, an elliptical table representing the earth's orbit, a light at one focus of the elliptical table representing the sun, a fixed meridian and movable time-band for indicating the time, and a special construction for effecting the proper motion of the two globes with respect to each other and to other parts of the system. The dome or arch representing the celestial sphere may be the concave ceiling of a room or a concave skeleton provided with a cloth covering, or the dome may be constructed in any other suitable way. The heavenly bodies—stars, planets, &c.—may be well represented by perforations cut through the ceiling of the dome for the passage of light from the exterior, but may be also represented by characters marked on the interior of the dome. The observer stands with the globes, &c., within the dome or artificial celestial sphere, the dome being of course of sufficient size to inclose the observer and apparatus, thus affording the proper point of view for observing the heavenly bodies as represented on the artificial celestial sphere. The use of the perforated dome enables the production of light and shadows within the dome by excluding the external light except where it passes through the perforations. The light shining through these perforations representing the heavenly bodies will, to the observer within, give an extremely realistic illustration of the actual celestial sphere.

The preferred form of my invention is illustrated in the accompanying drawings, wherein, like letters referring to like parts throughout the several views—

Figure 1:
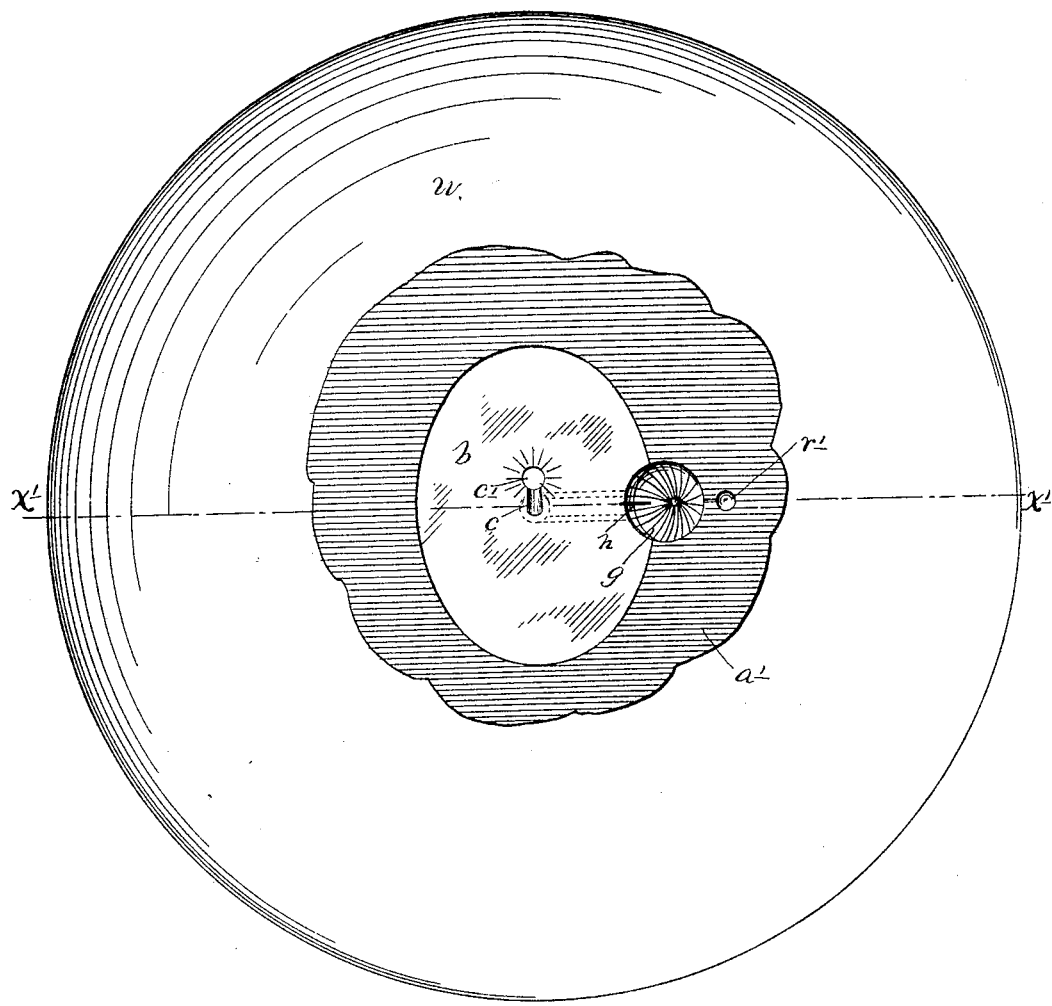
Figure 2:
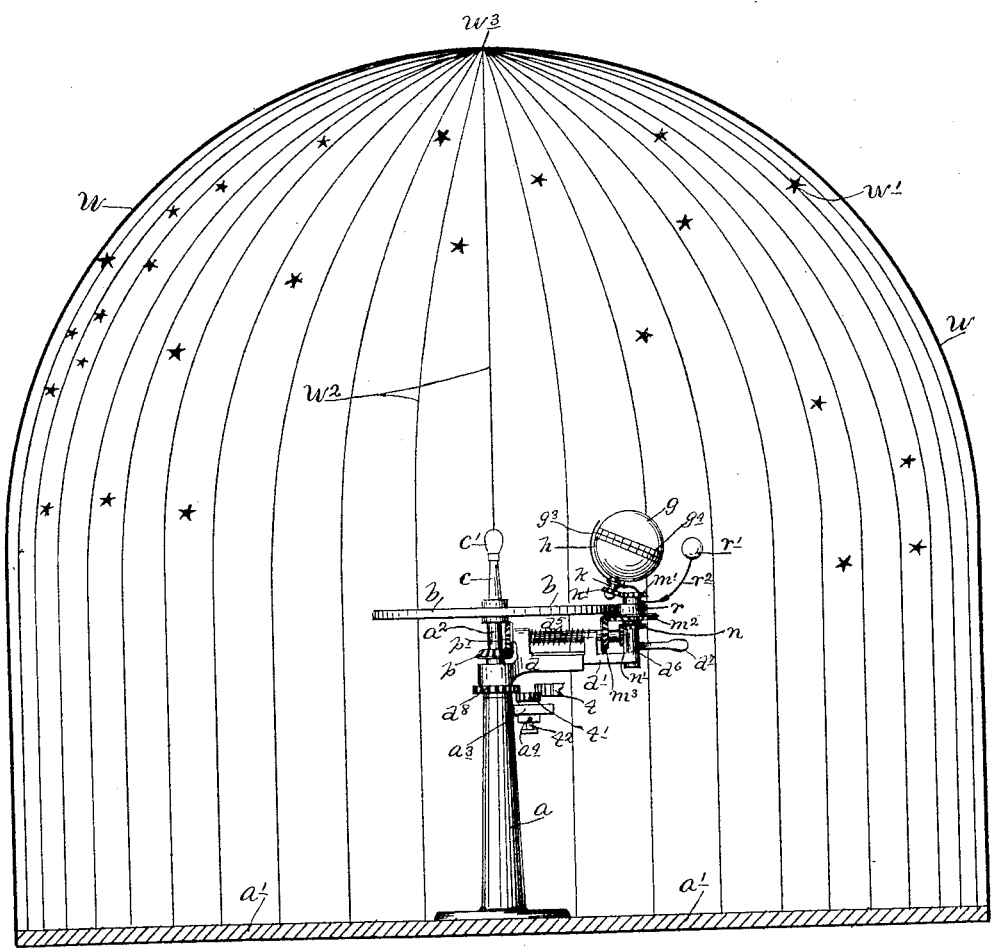

Figure 1 is a plan view of the entire apparatus, a portion of the dome being broken away to show the interior of the same. Fig. 2 is a vertical transverse section taken through the dome on the line $x'\ x'$ of Fig. 1, the mechanism within the dome being shown in full side elevation. Fig. 3 is a transverse vertical section taken through the interior mechanism of the apparatus, substantially on the line $x'\ x'$ of Fig. 1, some parts being shown in full and others being broken away. Fig. 4 is a vertical section through the earth globe and a portion of its driving-gear, taken on the line $x'\ x'$ of Fig. 1; and Fig. 5 is a view in perspective of the crank-shaft spindle on which the earth globe is mounted.

$a$ is a central support fixed to the floor $a'$.

$b$ is the elliptical table, rigidly secured to the upper end of a vertical post $a^2$, projecting upward from and rigidly secured to the support $a$.

$c$ is a light-staff detachably connected to the post $a^2$ and having at its upper end an incandescent lamp $c'$. The light-staff $c$ is bent so as to bring the light of the lamp $c'$ perpendicularly over one focus of the elliptical table to give the proper position of the sun with respect to the earth's orbit.

$d\ d'$ are respectively the inner and outer sections of an extensible bracket, which, as shown, telescope with each other.

$e\ e'$ are corresponding sections of an extensible shaft, which, as shown, telescope with each other and are compelled to turn together by a key and slot $e^2$.

$d^3\ d^4$ are bearings respectively from the bracket-sections $d$ and $d'$ and supporting, respectively, the shaft-sections $e$ and $e'$.

$d^5$ is a coiled spring surrounding the sectional shaft and having its ends connected one to the bearing $d^3$ and the other to the bearing $d^4$. The bracket-section $d'$ is provided at its outer end with a vertical socket $d^6$, from which projects a handpiece $d^7$.

$f$ is a crank-shaft loosely fitting in the socket $d^6$, carrying at its upper end an angular projection or spindle $f'$, which, as shown, is formed integral with the crank $f$, and terminates in a conical point $f^2$, as best illustrated in Figs. 4 and 5.

$g$ represents the earth globe, which is provided at its center of gravity with a conical seat $g'$, held in place by a transverse tube $g^2$, passing through the globe and open at its lower end to permit the passage of the spindle $f'$ and the engagement of the bearing-point $f^2$ with the conical bearing $g'$.

$g^3$ is a line representing the earth's equator, and $g^4$ is a time-band located parallel with the equator and marked with time divisions indicating fractions of a day.

$h$ is a fixed meridian secured to the horizontal portion of the crank $f$ and coöperating with the time-band $g^4$ to indicate the time.

$k$ is a driving-hub loose on the spindle $f'$, provided with a gear-wheel $k'$ and a pair of upwardly-projecting driving-pins $k^2$, which engage through perforations $g^5$ in the globe $g$. (See Fig. 4.)

It should be here noted that the perforations $g^5$ are much larger than the pins $k^2$, and hence as the engagement of the point $f^2$ of the spindle $f'$ with the conical seat $g'$ of the globe $g$ is at the exact center of gravity of the globe the globe will be supported entirely by its conical bearing without interference from the pins $k^2$. These pins $k^2$, under the rotation of the driving-hub $k$, bear lightly against the walls of the perforations $g^5$ to drive the globe $g$.

$m$ is a loose sleeve on the crank-shaft $f$, which is provided with a gear $m'$, engaging the gear $k'$ of the hub $k$, and with another gear $m^2$, which engages a gear $m^3$, rigid on the shaft-section $e'$.

$n$ is a bevel-gear rigidly secured to the crank $f$ and engaging a bevel-gear $n'$, rigidly secured with the gear $m^3$ and shaft-section $e'$.

$p$ is a primary gear held stationary and fixed to the post $a^2$ and in engagement with a movable bevel-gear $p'$, fixed to the inner end of the shaft-section $e$.

$r$ is an antifriction-roller loose on the gear-sleeve $m$.

$r'$ is the moon globe, carried by and detachably connected to the roller $r$ by means of a sectional arm $r^2$. This roller $r$ is held firmly in frictional contact with the outer margin of the elliptical table $b$ by the coiled spring $d^5$, and it will be noted that the arm $r^2$ projects from the roller $r$ from a point above the upper surface of the table.

The hub of the bracket-section $d$ is mounted for pivotal motion in a horizontal plane parallel with the table $b$ on the post $a^2$ and, as shown, is provided with a gear $d^8$.

$a^3$ is an arm projecting from the support $a$.

$t$ is one member of a train of gears connected to a motor, (not shown,) such as clockwork or an electric motor.

$t'$ is a shiftable pinion carried by a vertically-movable shaft $t^2$, mounted in the arm $a^3$ and held in either of two positions, to throw the gear $t'$ either into or out of engagement with the gear $d^8$, by means of a pin $a^4$, engaging through perforations in said bracket $a$ and shaft $t^2$.

$w$ is the dome or arch representing the celestial sphere. The stars are represented thereon by star-like perforations or marks, such as $w'$, which, as shown, indicates the north star, and the divisions for measurement by great circles, such as $w^2$, representing the celestial meridians, and $w^3$ the pole of the elliptic.

The operation is as follows: Assuming all the parts in position, as shown, then by taking hold of the handle $d^7$ the bracket $d$ $d'$ may be made to make a revolution around the table $b$ and post $a^2$. Under this movement the earth will make a complete revolution on its orbit parallel with the margin of the table, and the proportions of the gears $p$ $p'$ and $n$ $n'$ are such that the crank $f$ will make one complete revolution with respect to its seat $d^6$, thereby holding the axis of the earth in a constant direction or in line with the north star. The proportions of the gears $k'$, $m'$, $m^2$, and $m^3$ are such that under the orbital movement of the earth the earth globe will be revolved on the spindle $f'$ $f^2$ to illustrate day and night and their time divisions. Again, under the orbital motion of the earth the antifriction-roller $r$ by its frictional contact with the table $b$ will cause the moon to revolve around the earth, and the lights and shadows will illustrate the different phases thereof.

As is obvious, by using a clock or other suitable time-motor applied through the gears $t$ $t'$ $d^8$, as illustrated, the relative time relations could be shown.

It may be remarked that in the accompanying drawings no attempt has been made to give accurate timing to the gearing employed, as this was not deemed essential for the purposes of this application.

It has not been deemed necessary for the purpose of this application to specify in detail all the various phenomena which may be illustrated by the use of my apparatus. It must be evident, however, that the leading features of the Copernican system may be exhibited thereby.

The expression "observing apparatus," used throughout the specification and the claims, is intended to include any and all devices of this general nature which include as essential elements thereof an earth globe indicating the earth, a moon globe, and an artificial light indicating the sun, the said parts being so mounted as to indicate or represent the relations which the said parts bear to each other in the solar system.

What I claim, and desire to secure by Letters Patent of the United States, is as follows:

1. An artificial celestial sphere, constructed in the form of a darkened dome, marked on its concave, to exhibit the heavenly bodies, and adapted to permit the observer to be located with the observing apparatus within the same, and the observing apparatus located within said dome, comprising as one of its elements, an artificial light indicating the sun, whereby, the appearance of a night sky may be obtained in the daytime, substantially as described.

2. The combination with the central support, of the elliptical table or orbit, the automatically extensible and contractible arm, pivoted on said support, provided with a vertical socket in its outer end, the earth-globe support loosely mounted in said socket, the loose roller on said earth-globe support in frictional contact with the edge of said table and revolved thereby, and the moon globe carried by said roller, substantially as and for the purposes set forth.

3. The combination with the support $a$ $a^2$, the table $b$ held by said support, the extensible bracket $d$ $d'$ pivoted on the rod $a^2$ and provided with the socket $d^6$, the telescoping shafts $e$ $e'$, the spring $d^5$ connecting the bracket-sections $d$ $d'$, the crank-shaft $f$ in socket $d^6$ having the spindle $f'$, the driving-hub $k$ loose on the spindle $f'$ and provided with the gear $k'$, the earth globe $g$ on spindle $f'$ driven from hub $k$, the loose gear-sleeve $n$ on crank-shaft $f$, provided with the gears $m'$ $m^2$, the former of which engages the gear $k'$, the gear $m^3$ engaging gear $m^2$, the miter-gears $n$ $n'$ and $p$ $p'$, as shown and described, the loose roller $r$ on the hub $m$, and the moon globe $r'$ carried by said roller $r$, all arranged and operating substantially as described.

In testimony whereof I affix my signature in presence of two witnesses.

ANGUS J. McDONALD.

Witnesses:
J. M. FONTER,
JAS. W. MALLON.